Figure 1:
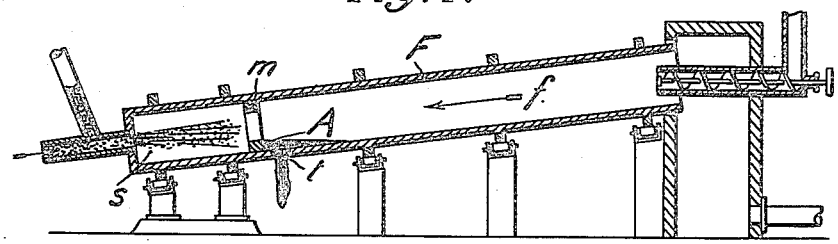

Jan. 12, 1937. L. P. BASSET 2,067,373
PROCESS FOR THE MANUFACTURE OF IRON OR STEEL
AND PORTLAND CEMENTS IN A ROTARY FURNACE
Filed July 24, 1933

L. P. Basset
INVENTOR

By: Marks & Clerk
Attys.

Patented Jan. 12, 1937

2,067,373

UNITED STATES PATENT OFFICE 2,067,373

PROCESS FOR THE MANUFACTURE OF IRON OR STEEL AND PORTLAND CEMENT IN A ROTARY FURNACE

Lucien Paul Basset, Paris, France

Application July 24, 1933, Serial No. 682,010
In France July 25, 1932

1 Claim. (Cl. 75—30)

The invention relates to the process for the manufacture of iron or steel and Portland cements or hydraulic lime in a rotary furnace, the principle of which has been set forth in my patent dated 14th of February, 1933, No. 1,897,881.

It is here recalled that the process in question is characterized in that the slag is supplied with the necessary quantity of lime in order to satisfy the chemical analysis of Portland cement or hydraulic lime and that the constituents of this cement are placed in a form adapted to produce a solid solution, by crushing these constituents into a state of an extremely fine powder. The mixture thus prepared travels through a rotary furnace which employs a heating agent formed by a flame obtained from the combustion of coal pulverized to a suitable degree of fineness and burning in a suitable amount of air to give the necessary and sufficient amount of carbon monoxide to prevent the reoxidation of the ferrous product.

In this process the metal is occluded in the grains of cement. The mixed metal-cement product has the appearance of concretions similar to clinkers.

As the result of further research the applicant has evolved a simplified technique which produces a great economy in the process in question.

The characteristic feature of the improved process which forms the subject of the present invention consists in working at a technically high temperature, that is to say, at a temperature greater than that which would be sufficient to satisfy both the conditions of the metallurgical treatment and the technique of the manufacture of cement according to the above mentioned process.

This treatment at a high temperature gives the two following practical results simultaneously:

In the first place the metallic occlusion in the grains of cement is avoided. A natural separation of the metal and cement occurs inside the furnace, the metal passing into the liquid state and collecting in the furnace from which it can be collected by gravity by means of simple arrangements of which an example will be given below without it being necessary to crush the mixed product and proceed with a magnetic separation as before.

Further, when the furnace rises in temperature the iron oxide is completely reduced so that the fluxing action normally performed by this oxide does not take place. Consequently the fusibility of the clinkers is decreased and it becomes possible, in the charging mixture, to put into combination elements (ore, coal and lime) which are no longer crushed to an extreme degree of fineness but are in the form of much larger particles than those which were necessary in the case of the above described technique.

This new embodiment of the process thus gives the following two-fold advantageous result:—

The metal and the cement are separated directly and the manual labour and power required for preparing the materials are reduced.

One construction of the furnace for collecting the liquid metal by gravity is illustrated diagrammatically in the accompanying drawing.

Figure 2:
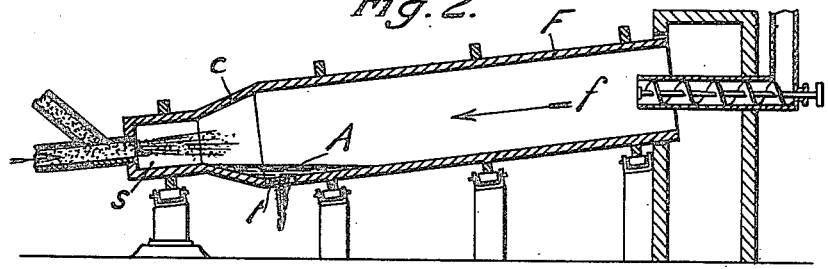

In the accompanying drawing, Figure 1 shows a longitudinal section of a rotary furnace suitable for carrying out the invention and Figure 2 is a similar view of a modified form of furnace.

It will be recalled that the manufacture in question is carried out in a rotary furnace formed by a main cylindrical body of great length having a slightly inclined longitudinal axis.

A tapping hole $t$ is formed at a suitable distance from the outlet end $s$ of the furnace F, in which the mixture travels in the direction of the arrow $f$. Beyond this hole the furnace is provided with a circular wall $m$ (Figure 1) which extends over the whole inner surface and during the rotation of the furnace forms a kind of dam for the liquid metal which collects at A and flows through the hole $t$ each time the furnace completes a rotation. The clinker passes out at the front of the furnace and falls into the cooler.

In the case when the furnace comprises near its outlet end a conical zone $c$ (Figure 2) the latter may perform the function which was given to the wall $m$ by opposing the progressive motion of the metal by means of the resistance provided by the slope of the cone, so that the metal is compelled to flow through the hole $t$.

Naturally, the means above described which are to be recommended on account of their simplicity, are only given by way of example and are not to be considered as limitations of the process in any way.

In the above mentioned prior specification it was stated that the mixture of ore, coal and lime (to which if necessary silica or alumina were added) should preferably be crushed in water before its introduction into the furnace.

It has been recognized that this liquid treatment is not without disadvantages because for producing one ton of cast iron and one and a half tons of cement approximately, it is necessary to handle from 2500 to 3500 kgs. of water. This involves a high consumption of fuel without advantage to the output.

According to the present invention this treatment is effected in a dry state that is to say that the materials are crushed dry and are then introduced in the dry state in the furnace.

Experiments have shown that this treatment in the dry state while giving a great economy in fuel, does not in any way reduce the quality of the final products and the output. Naturally the materials may be moistened to a certain extent in order to reduce dust to a minimum or in some cases, one of the elements will bring its moistening water with it. For example the ore and the coal will be crushed in the dry state and the mixture will be moistened by supplying the lime in the form of a paste.

I claim:

A process for the simultaneous manufacture of iron or of its carburetted compounds and of Portland cement or hydraulic lime, which process consists in introducing in a rotary furnace a mixture comprising oxidized iron ore to be reduced, coal for reduction and carburation, and additional materials usually calcareous and necessary for the formation of a slag corresponding to the composition of Portland cement or hydraulic lime, said furnace being heated by a flame of coal dust burning in the proportion of air necessary for producing oxide of carbon in an amount sufficient for preventing reoxidation, the process further consisting in maintaining the temperature within the furnace so high that iron oxide is completely reduced and fused, so that the fluxing action normally performed by this oxide does not take place, solid cement clinkers which are not overburned and which are free from sesquioxide of iron are formed, and the reduced iron is entirely eliminated from the clinker and accumulates in the lower part of the furnace.

LUCIEN PAUL BASSET.